(12) United States Patent
Ewing

(10) Patent No.: US 11,707,153 B2
(45) Date of Patent: Jul. 25, 2023

(54) LIQUID FILTERING PRESS

(71) Applicant: Todd Ewing, Walnut Creek, CA (US)

(72) Inventor: Todd Ewing, Walnut Creek, CA (US)

(*) Notice: Subject to any disclaimer, the term of this patent is extended or adjusted under 35 U.S.C. 154(b) by 121 days.

(21) Appl. No.: 17/180,834

(22) Filed: Feb. 21, 2021

(65) Prior Publication Data

US 2022/0265081 A1 Aug. 25, 2022

(51) Int. Cl.
*A47J 31/20* (2006.01)
*A47G 21/10* (2006.01)
*B30B 9/06* (2006.01)

(52) U.S. Cl.
CPC ............ *A47J 31/20* (2013.01); *A47G 21/106* (2013.01); *B30B 9/06* (2013.01)

(58) Field of Classification Search
None
See application file for complete search history.

(56) References Cited

U.S. PATENT DOCUMENTS

| | | | |
|---|---|---|---|
| 620,047 A | 2/1899 | Neal | |
| 1,386,340 A * | 8/1921 | Wuster | B01D 33/015 210/359 |
| 1,959,615 A | 5/1934 | Derrah | |
| 2,053,021 A | 9/1936 | Bruno | |
| 2,601,821 A * | 7/1952 | Johnson | A47J 31/02 99/287 |
| 2,887,948 A | 5/1959 | Kramer et al. | |
| 3,804,635 A * | 4/1974 | Weber | A47J 31/38 99/302 R |
| 4,214,519 A | 7/1980 | Stollenwerk et al. | |
| 4,804,470 A * | 2/1989 | Calvillo | B01D 29/27 210/474 |
| 4,946,591 A * | 8/1990 | Mealey | B01D 29/085 210/474 |
| 5,186,828 A * | 2/1993 | Mankin | B01D 29/27 210/474 |
| 5,335,591 A | 8/1994 | Pozar | |
| 5,368,728 A * | 11/1994 | Reaves | B01D 29/27 210/474 |
| 5,417,906 A * | 5/1995 | Chiodo | B01D 39/12 264/156 |
| 5,453,189 A * | 9/1995 | Joergensen | A47J 31/20 210/473 |
| 5,618,570 A * | 4/1997 | Banks | A47J 31/20 99/287 |
| 5,672,271 A * | 9/1997 | Dye | E04H 4/1272 210/405 |
| 5,738,786 A * | 4/1998 | Winnington-Ingram | A47J 31/0615 D7/415 |
| 5,853,581 A * | 12/1998 | Rayborn | A47J 43/24 210/474 |
| 5,935,435 A * | 8/1999 | Hasler | B01D 29/085 210/473 |

(Continued)

*Primary Examiner* — Robert J Popovics
(74) *Attorney, Agent, or Firm* — Morrison & Foerster LLP

(57) ABSTRACT

A liquid filtering press comprises two rigid baskets that stack together in a nested fashion to squeeze a filtration bag containing an unfiltered liquid. The liquid permeable baskets permit liquid to flow out freely through the entire surface of the filtration bag while preventing direct hand-to-liquid contact during pressing. A linkage between the baskets facilitates opening, closing, and pressing operations.

14 Claims, 8 Drawing Sheets

(56) References Cited

U.S. PATENT DOCUMENTS

| | | | |
|---|---|---|---|
| 6,436,286 B1 * | 8/2002 | Scott | B05B 9/03 |
| | | | 210/474 |
| 6,561,080 B1 * | 5/2003 | Feeney | A47J 31/24 |
| | | | 99/295 |
| 6,685,843 B2 * | 2/2004 | Leaverton | B01D 29/27 |
| | | | 210/485 |
| 6,797,164 B2 * | 9/2004 | Leaverton | B01D 29/27 |
| | | | 210/485 |
| 6,878,266 B2 * | 4/2005 | Leaverton | C02F 1/004 |
| | | | 220/495.11 |
| 6,939,463 B2 * | 9/2005 | Leaverton | C02F 1/004 |
| | | | 220/495.11 |
| 7,299,745 B2 | 11/2007 | Nelson et al. | |
| 7,389,720 B2 | 6/2008 | Haverstock | |
| 7,849,784 B2 * | 12/2010 | Adler | A47J 31/02 |
| | | | 99/287 |
| 8,051,766 B1 | 11/2011 | Yu et al. | |
| 8,205,575 B2 * | 6/2012 | Nicastle | A01K 7/00 |
| | | | 119/72 |
| 8,679,329 B2 * | 3/2014 | Vreeland | B01D 23/04 |
| | | | 210/170.03 |
| 9,498,081 B2 | 11/2016 | Baccetti | |
| 9,844,229 B2 | 12/2017 | Wettlaufer et al. | |
| 10,226,147 B2 * | 3/2019 | Harper | A47J 31/043 |
| 10,426,137 B2 * | 10/2019 | Thomas | A01K 7/005 |
| 10,694,883 B2 * | 6/2020 | Harper | A47J 31/043 |
| 11,297,971 B2 * | 4/2022 | Harper | A47J 31/20 |
| 2003/0094423 A1 * | 5/2003 | Leaverton | B01D 29/27 |
| | | | 210/167.12 |
| 2003/0205537 A1 * | 11/2003 | Leaverton | C02F 1/004 |
| | | | 210/767 |
| 2004/0104163 A1 * | 6/2004 | Leaverton | C02F 1/00 |
| | | | 210/237 |
| 2004/0231608 A1 * | 11/2004 | Grace-Kellogg | A01K 7/00 |
| | | | 119/72 |
| 2006/0185521 A1 * | 8/2006 | Publicover | A47J 31/20 |
| | | | 99/279 |
| 2006/0260471 A1 * | 11/2006 | Adler | A47J 31/02 |
| | | | 99/279 |
| 2008/0237153 A1 * | 10/2008 | Nicastle | A01K 7/00 |
| | | | 210/806 |
| 2008/0290042 A1 * | 11/2008 | Hanson | E03F 5/0404 |
| | | | 210/170.03 |
| 2009/0169756 A1 * | 7/2009 | Joosten | B44D 3/10 |
| | | | 118/300 |
| 2009/0229472 A1 * | 9/2009 | Ferrara, Jr. | A47J 31/18 |
| | | | 99/323 |
| 2013/0020242 A1 * | 1/2013 | Vreeland | E03F 5/0404 |
| | | | 210/163 |
| 2018/0192809 A1 * | 7/2018 | Harper | A47J 31/043 |
| 2019/0200801 A1 * | 7/2019 | Harper | A47J 31/043 |
| 2020/0070071 A1 * | 3/2020 | Chin | B01D 29/114 |
| 2020/0397179 A1 * | 12/2020 | Harper | A47J 31/20 |
| 2022/0265081 A1 * | 8/2022 | Ewing | A47G 21/106 |

* cited by examiner

LIQUID FILTERING PRESS

BACKGROUND OF THE INVENTION

Filtering is an important step in the preparation of many beverages such as cold-brewed coffee, nut milk, and juice. Filtering is also an important step in the preparation of infused oils. Currently available filtering methods suffer from limitations related to speed, clogging, liquid volume, cost, and maintenance.

Cold brewed coffee is commonly filtered with traditional pour-over paper filters, fabric filters, or nylon mesh filters with various pore sizes, but the process is slow and prone to clogging since it relies on gravity alone to force the liquid through the filter. Paper filters and smaller pore-size, 80-micron, nylon filters can filter a batch of cold-brewed coffee, but these filters require up to several hours to operate and require coarse-ground coffee to prevent clogging. Coarse-ground coffee is itself a problem because it reduces the amount of coffee extracted from the grounds and increases the amount of coffee bean waste with cold-brewing.

Larger pore-size, 200-micron, nylon filters can filter a batch of cold-brewed coffee much faster, typically in less than a minute, and are less prone to clogging, but they allow finely-ground coffee to pass through the filter. The finely ground coffee present in the final beverage confers an unpleasant gritty taste of silt and develops a bitter taste over time that reduces product shelf-life.

Hand-held filtration bags, such as nut milk bags, are described that utilize nylon or cotton mesh. These filtration bags can be closed off at the top, allowing a user to apply pressure directly on the bag by twisting and squeezing with bare hands. Hand-held filtration bags offer a large surface area that is less vulnerable to clogging from finely ground solids compared to pour-over filters. These bags are also manufactured with a range of mesh sizes to match the needs for each beverage and filtering application.

Hand-held filtration bags have many unfavorable features that arise from the direct hand-to-beverage contact during pressing. Typically, the beverage flowing out of the filtration bag also flows over both hands while the bag is squeezed. Direct hand-to-beverage contact can become a source of contamination to the beverage. Direct hand-to-beverage contact can appear unsanitary to beverage customers in a commercial setting such as a coffee shop or juice shop. Direct hand-to-beverage contact can also become a source of pain and discomfort to the operator when the beverage liquid is either very hot or very cold and when squeezing is required for more than a few seconds. For example, immersing hands in ice-cold water is itself uncomfortable, but simultaneously sustaining a tight hand grip on an ice-cold wet object is surprising painful and frustrating.

Coffee presses are described by which a user applies force to a plunger to speed filtration. Typical coffee presses are based on the French Press in which a plunger pushes a disc-shaped filter through the beverage mixture (U.S. Pat. Nos. 2,053,021, 7,389,720, 8,051,766, and 9,498,081), or newer presses in which a plunger pushes the beverage liquid out through a disc-shaped filter installed as an endcap (U.S. Pat. No. 7,849,784). These coffee presses are well-suited for coarsely ground or hot-brew coffee but are susceptible to clogging by finely ground cold-brew coffee. As the filters on these coffee presses become increasingly clogged, the user must apply an increasing amount of force to the plunger. It is common for users to push too hard and break the plunger and filter sealing mechanisms in their coffee presses.

Fruit and wine presses are described by which a pressure plate squeezes fruit pulp enclosed in a filter bag and forces liquid out through the bag and through the perforated sides of an enclosing cylinder or box. Examples include the basket press which uses mechanical force delivered by a lever or screw and the bladder press or diaphragm press which use hydraulic force (U.S. Pat. Nos. 4,214,519, 7,299,745, and 9,844,229). Such presses address the issues related to clogging, sanitation, and comfort, but they are prohibitive for typical consumers and single-serving batches based on size, cost, and maintenance.

Tea bag presses are described by which opposing metal plates squeeze a tea bag to force the last few drops of tea from the bag. Examples include a scissor-style press using opposing perforated teaspoons (U.S. Pat. No. 2,887,948) and a scissor-style press using opposing five-centimeter square perforated flat metal plates (U.S. Pat. No. 5,335,591). Tea bag presses are simply too small to handle the volume of liquid to be pressed for cold brewing. It's worth considering whether a tea bag press could be enlarged to squeeze a typical hand-held filtration bag, for example with perforated plates measuring 20 centimeters across. Unfortunately, the tea bag press mechanism would require that the hand-held filtration bag be sealed shut, otherwise the filtration bag contents would simply be ejected through the top opening of the bag without any filtration.

Lemon presses are described by which opposing cups squeeze the juice out of a lemon or other citrus fruit cut in half. Examples include a table-top squeezer (U.S. Pat. No. 620,047) and a hand-held squeezer (U.S. Pat. No. 1,959,615) that utilize a pressing cone or reamer. Lemon squeezers are larger than tea bag presses, but they are still too small to process the volume of liquid to be pressed for cold brewing. It's worth considering whether a lemon squeezer could be enlarged to squeeze a typical hand-held filtration bag, for example with cups measuring 20 centimeters across. Unfortunately, the opposing surfaces of an enlarged lemon squeezer, particularly the reamer, would not provide sufficient liquid flow out of the hand-held filtration bag to prevent clogging of a cold brew coffee.

There is tremendous unmet need for a liquid filter press that can conveniently process infused oils and beverages such as cold-brew coffee, nut milks, and juices. A beverage filter press is needed that performs as well as a hand-held filtration bag, that minimizes direct hand-to-beverage contact, and that is as convenient as a tea bag squeezer and lemon squeezer. Such a press would help support and promote the current consumer demand for healthier, cold-brewed beverage options.

SUMMARY OF THE INVENTION

The present invention describes a liquid filtering press that squeezes a filtration bag with a hand- or machine-operated press. The press comprises two rigid baskets that squeeze the filtration bag as the baskets nest together. A linkage between the baskets facilitates closing the press, squeezing the filtration bag, opening the press, and removing said bag. The rigid baskets force filtered liquid out through the entire surface of said bag—even surface regions that are in direct contact with the baskets. The rigid baskets also keep the bag and filtered liquid away from direct hand contact, ensuring maximum hygiene and comfort during pressing.

In some embodiments of the present invention, said baskets may be deep and narrow, and said linkage may be a sliding hinge and rail that allows one basket to slide into the other during pressing. In some embodiments, said baskets may be shallow and wide, and said linkage may be a hinge that allows one basket to swing into the other during pressing.

In some embodiments, said filtration bag may be made from textiles or paper. Said bag may be fashioned as a sack with an open top and optional drawstring closure. Said bag may be fashioned as a simple pleated sheet of textile or paper whose outer pleated edges are gathered up to form the sides of the bag during filling and then gathered together further to form the top of the bag during pressing.

In some embodiments of the present invention, a lower basket supports the filtration bag from below while an upper basket presses the filtration bag from above. In some embodiments, a receiving vessel holds the press directly by gripping the lower basket with an open throat of matching size and shape. In some embodiments, a support attaches to the lower basket and holds the press in the mouth of a receiving vessel to accommodate vessels with a wide range of opening sizes and shapes. In some embodiments, a funnel collects the filtered liquid released by the press and delivers the liquid to an open vessel or intake tube.

A deeper understanding of the nature and advantages of the present invention may be achieved by referring to the drawings and the remainder of the specification.

SPECIFICATIONS

Figure 1:
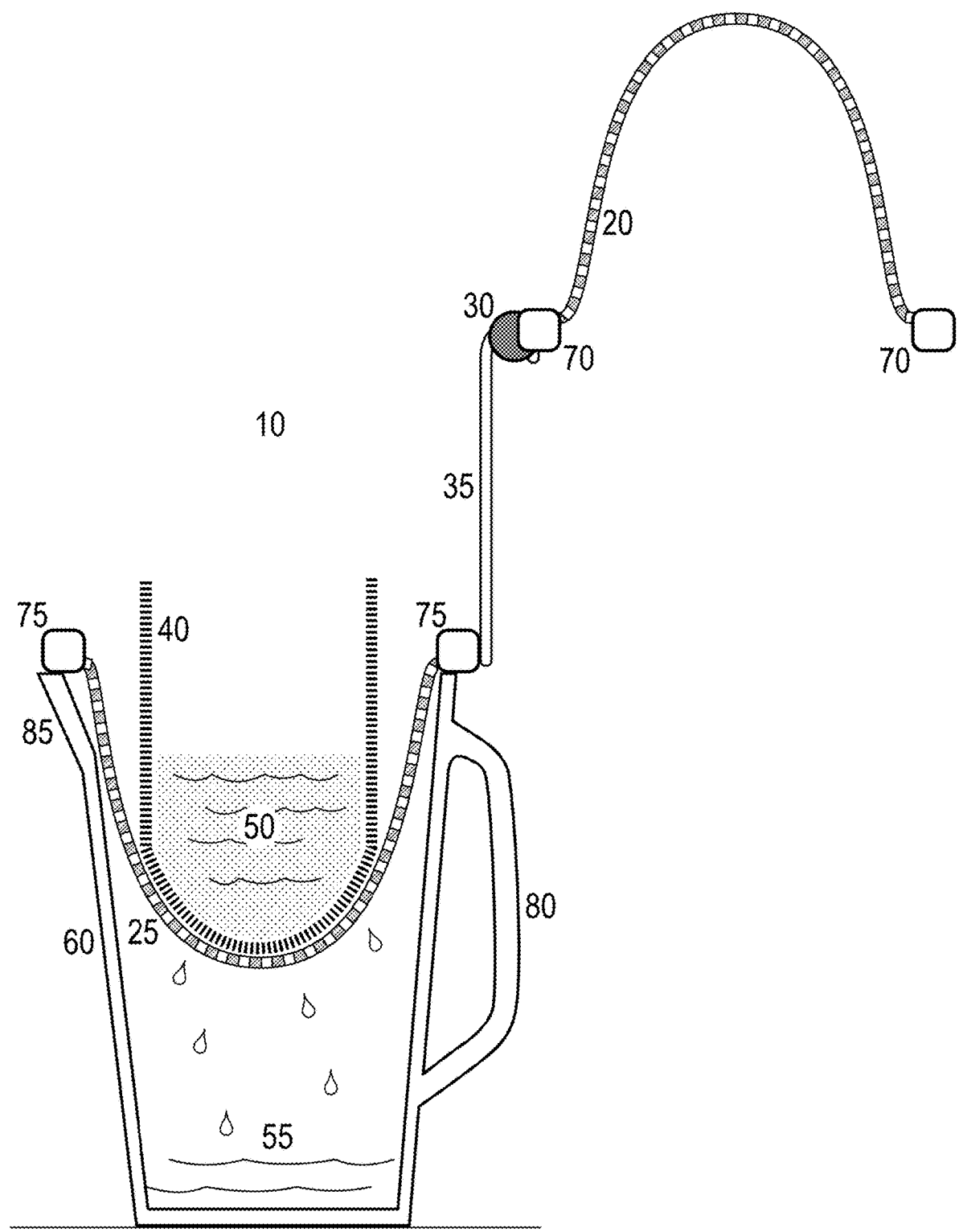
FIG. 1 shows a liquid filtering press 10 that utilizes two deep rigid baskets that slide apart on a sliding hinge and rail linkage according to a specific embodiment of the invention. Said press is shown in an open configuration representing the state during which a filtration bag and an unfiltered liquid are loaded into said press.

FIG. 1 shows a liquid filtering press 10 according to a preferred embodiment of the invention. Said press is shown in an open configuration representing the state during which an unfiltered liquid is loaded into the press. An upper basket 20 is lifted up and away to completely unstack from a lower basket 25. A sliding hinge 30 and rail 35 linkage between said baskets facilitates the opening, closing, and pressing operations. As shown in FIG. 1, the upper basket and sliding hinge are positioned at the top of the rail.

A filtration bag 40 rests in lower basket 25 with an unobstructed opening at its top through which it receives an unfiltered liquid 50. A vessel 60 is configured with an opening of matching size and shape to lower basket 25 to support the press and to receive filtered liquid 55 emitted from the press during its operation.

In said preferred embodiment, the press accommodates a variety of types of filtration bag 40 that may be constructed as an open-top sack with an optional closure device or as a circular sheet with pleated edges that collect together to form the sides of a bowl. The filtration bag may be manufactured from one or more materials selected from polyester, cotton, nylon, and paper. The filtration bag material may be fashioned as a woven or non-woven fabric with a mesh spacing selected from about 50 microns up to about 500 microns.

In said preferred embodiment, the rigid baskets and are fashioned from one or more materials selected from stainless steel, reed, wicker, bamboo, plastic, silicon, and aluminum. The basket material is fashioned as a lattice structure selected from woven mesh, spiral mesh, spider-weave mesh, and frame-reinforced woven mesh. The lattice is fashioned with a mesh spacing at least ten-fold wider than the filtration bag mesh spacing and is selected from about 500 microns up to about five millimeters.

In said preferred embodiment, the top edges of the rigid baskets and the opening of the vessel 60 are circular, though in other embodiments the top edges of the baskets and the vessel can be semicircular, rectangular, square, or polygon shaped. The diameter widths of the baskets and the opening of the vessel are about 150 millimeters. The depths of the baskets are about 150 millimeters, about equal in measurement to their diameter widths, which corresponds to a narrow and deep basket with a total volume of about one liter. This size of basket was found to perform very well when cold pressing up to 48 fluid ounces (1.5 liters) of cold-brewed beverage mixture—corresponding to six 8-ounce (250 milliliter) servings or eight traditional 6-ounce coffee servings. In other embodiments, the depths and widths of the baskets can vary in size from about 50 millimeters up to about 200 millimeters which corresponds to narrow and deep-shaped baskets with total volumes of about a half liter up to about four liters.

In said preferred embodiment, the shape of the sides of baskets 20 and 25 is selected to reduce snagging and pinching of filtration bag 40 when said baskets press together. A preferred shape of the sides of the baskets is the paraboloid shape such that their sides slope down nearly vertically from their top edges and gently curve inward to form deep rounded bottoms. Another preferred shape of the sides of the baskets is the conic section such that their sides slope slightly inward like an inverted cone while their bottoms are flat and circular with a smoothly rounded transition between their sides and bottom surfaces. Another preferred shape of the sides of the baskets is the hybrid cylinder and conic section shape such that the upper sides are shaped as cylinders with sides that angle vertically, while the lower sides of said baskets are shaped as conic sections as described above with a smoothly rounded transition midway between the cylinder and conic sections and another smoothly rounded transition at the bottom between the conic and flat bottom sections. The hybrid cylinder and conic section shape offers the greatest volume for any selected diameter width and depth of said baskets while still reducing snagging and pinching of said filtration bag during pressing.

In said preferred embodiment, the shape and dimensions of the sliding hinge 30 and rail 35 linkage are selected to provide optimal operation of the press. The shape of the rail is selected to be straight and to terminate at the top with a stop to prevent the hinge from disengaging from said rail. The length of the straight part of the rail is selected to measure slightly longer than the measured depths of the baskets in order to reduce bumping and scraping between said baskets during opening and closing of the press. Preferably, said rail length is about 33% longer than said basket depths to provide space for said filtration bag to extend above the top edge of said lower basket 25 and to fit below the bottom of said upper basket 20. Said rail length is preferred to be about 200 millimeters and can vary from about 100 millimeters up to about 300 millimeters according to various embodiments.

In a preferred embodiment, the top of rail 35 includes a curved or curled part that acts as a stop. The curved part prevents sliding hinge 30 from either sliding off the end of the rail or sliding back down said rail 35 when the upper basket 25 is lifted to its highest position when the press is fully open. The motion-locking mechanism of the fully open position allows the user to let go of said upper basket and use both hands to insert and position the filtration bag 40 and to fill said bag with the liquid 50. Said curved part of said rail also provides a natural feature that a user can hang from a wall hook for drying and storing the press in between uses.

The curved part of rail 35 is selected to follow an outward circular arc with a radius of about ten millimeters and an arclength of at least 90 degrees. Said hinge 30 allows upper basket 20 to swing by an angle sufficient to provide unobstructed access to said lower basket 25. Said hinge angle is typically found to be sufficient when the sum of said hinge angle and said rail arc distance is equal to or greater than about 180 degrees.

The width of sliding hinge 30 and rail 35 linkage is selected to provide sufficient stability and control during the opening, closing and pressing operations. A width of about one-fifth the total width of the baskets is found to sufficiently suppress the twisting of the baskets relative to each other and allows the press to feel rigid and secure during operation. A width smaller than about one-tenth the basket width tends to allow the baskets to twist relative to each other and causes the press to feel floppy and unreliable during operation. A width larger than about one-third the basket width can cause the rail to be awkward to grip with one hand and in turn cause the press to seem harder to control. In practice, the preferred widths of said sliding hinge 30 and said rail 35 are both about 30 millimeters across, though the widths can vary from about 10 millimeters up to about 100 millimeters according to various embodiments.

In said preferred embodiment, upper support 70 and lower support 75 are configured to be engaged by a user as comfortable fingertip gripping surfaces during opening, closing, and pressing operations. Said lower support 75 is further configured to hold said lower basket 25 above the opening of said vessel 60 which in turn holds entire said press 10 securely in places. Said supports 70 and 75 completely surround edges of said baskets 20 and 25 and extend about two millimeters radially from the outermost edge, though said supports can extend up to about 50 millimeters in various embodiments.

In said preferred embodiment, said vessel 60 can be configured as a pitcher with a handle 80 to assist lifting and a pour spout 85 to assist dispensing of filtered liquid 55. In other embodiments, said vessel 60 can be configured as a funnel with a linkage to an intake tube to transport the filtered liquid to storage or further processing at another location.

Figure 2:
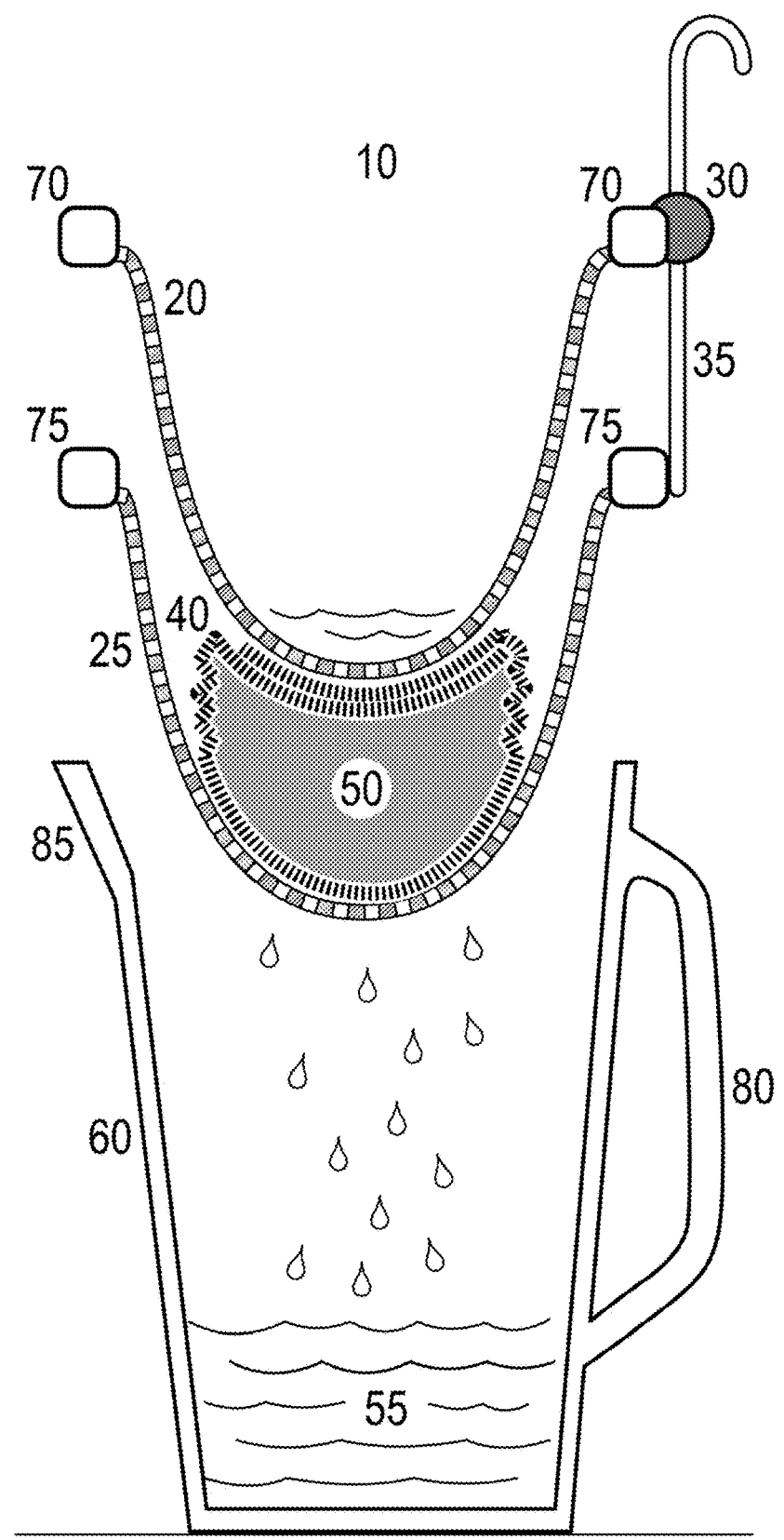
FIG. 2 shows said press 10 in a partially raised and partially closed configuration representing the state when a filtered liquid is being pressed out of said filtration bag according to a preferred embodiment of the invention.

FIG. 2 shows said liquid filtering press 10 in a raised and partially closed configuration representing the state when said filtered liquid 55 is pressed out of said filtration bag 40 according to a preferred embodiment of the invention. Said baskets 20 and 25 press said filtration bag 40 from above and below. To get to this configuration from the open position represented in FIG. 1, the top of said filtration bag 40 has been gathered and folded closed. Said upper basket 20 has been rotated about the curved top of said rail 35 and about the axis of said hinge linkage 30 by a total angle of about 180 degrees and has slid partly down said rail 35, while said lower basket 25 has been partly lifted up from said open vessel 60. Said opening at the top of said filtration bag 40 remains pressed closed by the sustained pressure from above and below by said baskets 20 and 25.

It is important to highlight how the sliding hinge 30 and rail linkage 35 stabilizes the press at this step of press operation. Specifically, the linkage helps to hold the upper basket in position as it contacts the full filtration bag 40. Since the upper basket is not yet nested into the lower basket, the upper basket would likely fall from its unstable position without support provided by the linkage. The stabilization provided by the hinge linkage allows the user to let go of the upper basket momentarily to establish a comfortable fingertip contact with supports 70 and 75 and begin squeezing the press.

The flow of said filtered liquid 55 passing out of said filtration bag 40 increases as the user simultaneously lifts both baskets while squeezing them together. Squeezing said press 10 increases the static pressure of said liquid 50 and overcomes the resistance of liquid flow through the small pores of said filtration bag 40. Lifting said press 10 also increases flow because it reduces the contact between the sides of said lower basket 25 and said open vessel 60 and relieves the effective restriction of liquid flow caused by any direct contact between these surfaces.

It is important to highlight how the press prevents direct hand-to-liquid contact at this step of operation. The user holds said supports 70 and 75 by the fingertips and squeezes together said baskets 20 and 25 while keeping the user's hands away from said filtration bag 40 and away from the flow of said filtered liquid 55 out of said press into said vessel 60. Consequently, the hand-to-liquid contact is prevented which increases the hygienics of said press 10 and said filtered liquid 55 while it also prevents the discomfort of prolonged hot- or cold-liquid exposure to the hands of the user.

As indicated in FIG. 2, some quantity of said filtered liquid 55 collects above said filtration bag 40 in bottom of said upper basket 20 which is addressed in the following step of press operation.

Figure 3:
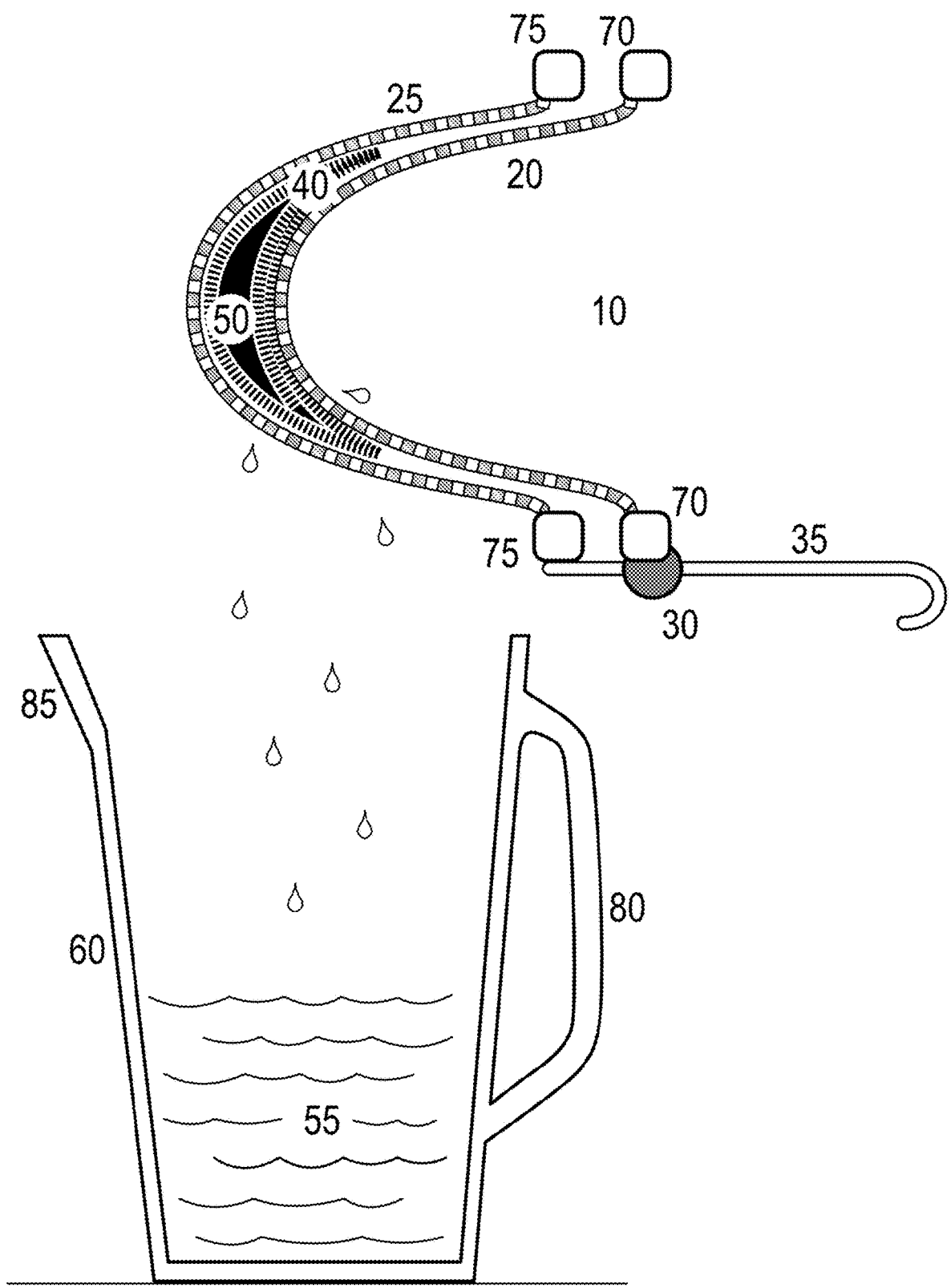
FIG. 3 shows said press 10 in a raised, rotated, and fully closed configuration representing the state when the residual quantity of said filtered liquid is pressed out of said filtration bag according to a specific embodiment of the invention.

FIG. 3 shows said liquid filtering press 10 in a rotated configuration representing the state when the remaining quantity of said filtered liquid 55 is pressed out of said filtration bag 40 according to a specific embodiment of the invention. Said press 10 is raised and disengaged from said opening of said vessel 60. Said press 10 is rotated about 90 degrees while said baskets 20 and 25 apply pressure to said filtration bag 40 from opposing sides rather than from above and below as represented in FIG. 2.

The raised and rotated orientation of said press 10 has several important functions in the pressing operation. First, said orientation pours off the portion of said filtered liquid 55 that collects above said filtration bag 40 in the lower region of said upper basket 20. Second, the rotated orientation enables the user to squeeze together said supports 70 and 75 using the thumbs and fingertips of both hands in a comfortable "steering wheel" grip. Third, said orientation enables the user to more clearly inspect the diminishing flow rate of said filtered liquid 55 and better decide when to stop squeezing said press.

Figure 4:
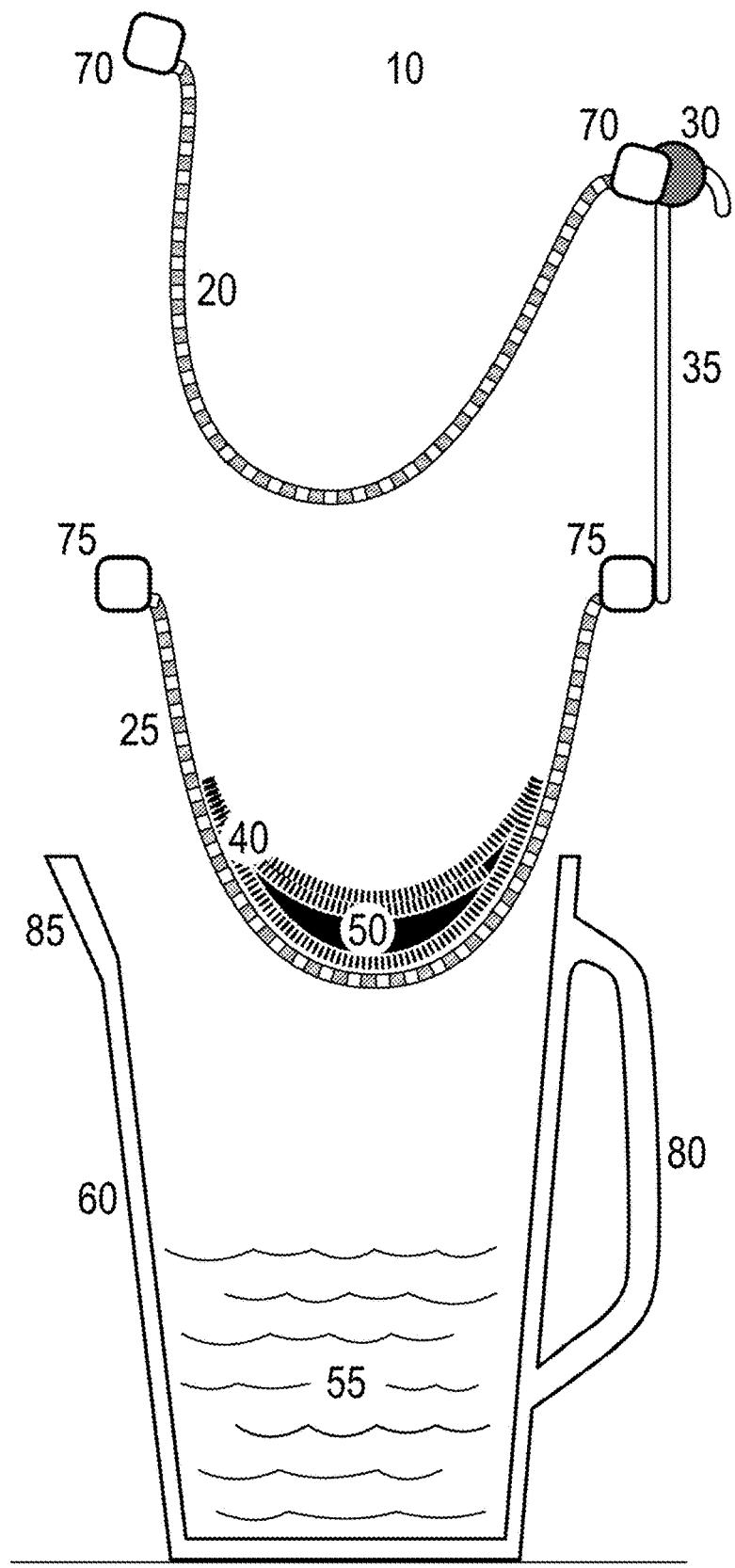
FIG. 4 shows said press 10 in an open configuration representing the state when pressing is complete according to a specific embodiment of the invention.

FIG. 4 shows the liquid filtering press 10 in a partly open configuration representing the state when pressing is complete and the fully pressed filtration bag 40 can be removed from the press according to a specific embodiment of the invention. Said press 10 is rotated back to a vertical orientation and remains raised and disengaged from the opening of vessel 60. The filtration bag 40 and a fully pressed cake of the residual solids from the unfiltered liquid 50 rest in the bottom of the lower basket 25. The entire volume of filtered liquid 55 has been collected within vessel 60.

The upper basket 20 and hinge 30 are fully slid up the straight part of rail 35 and partly slid around the curved part of said rail in order to lock said upper basket in a raised, unstacked position. It is important to highlight the importance of the sliding hinge and rail linkage to this step of the operation. Once the user has raised the upper basket and locked it in position, the user can let go of both baskets and conveniently hold the entire press by simply gripping the straight part of the rail. The user can then use a free hand to reach into the lower basket and remove the flattened filtration bag for cleaning or disposal. The press can be set aside for later cleaning. Said vessel 60 can be lifted by said handle 80 and said filtered liquid 55 can be dispensed with the aid of said spout 85.

Figure 5:
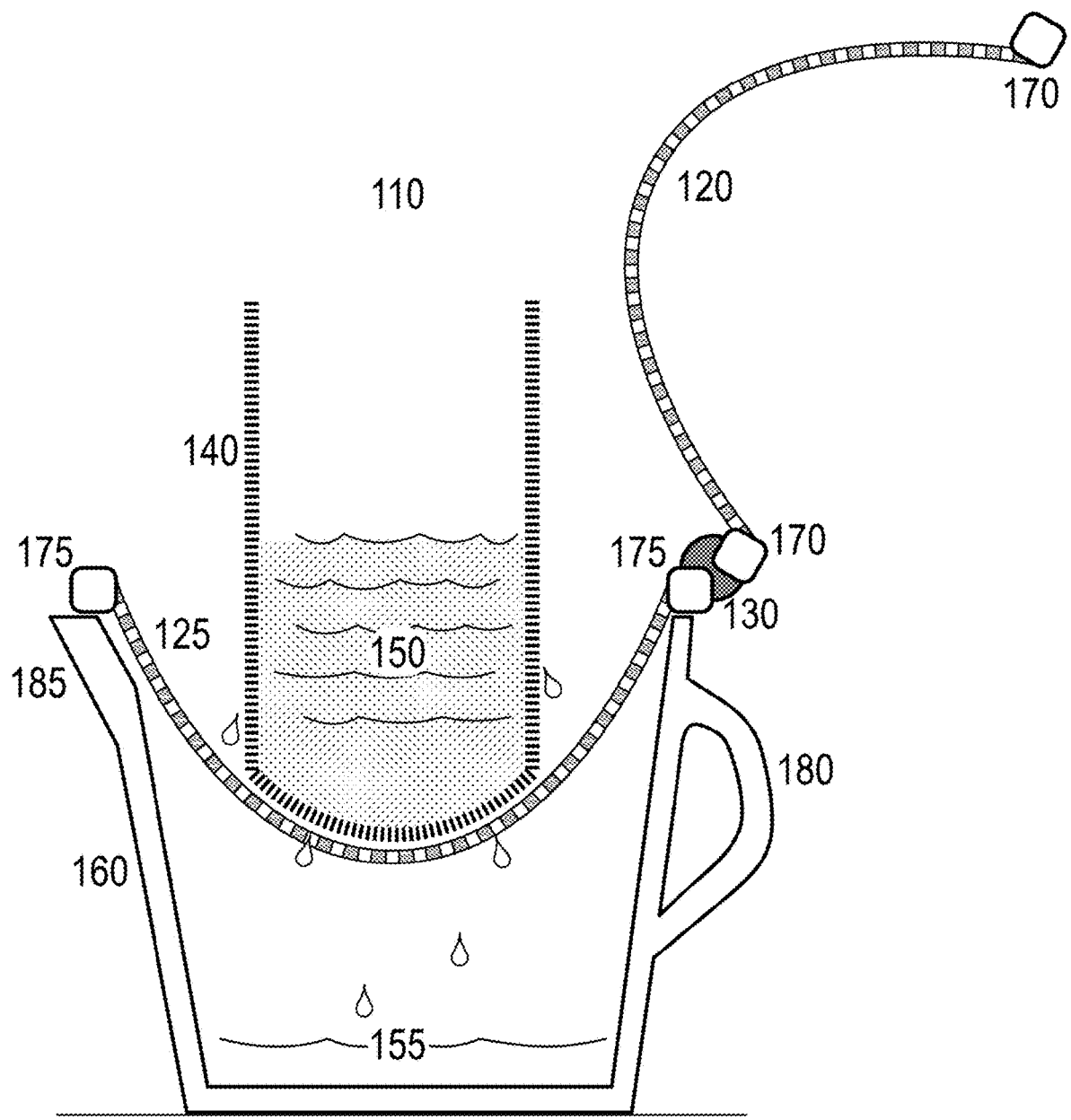
FIG. 5 shows a liquid filtering press 110 that utilizes two shallow rigid baskets that swing apart on a hinge linkage according to a specific embodiment of the invention. Said press is shown in an open configuration representing the state during which a filtration bag and an unfiltered liquid are loaded into said press.

FIG. 5 shows a liquid filtering press 110 that utilizes two wide rigid baskets 120 and 125 that swing open and closed on a hinge linkage 130 according to an embodiment of the invention. Said press 110 is shown in an open configuration representing the state during which a filtration bag 140 and an unfiltered liquid 150 are loaded into said press. Said hinge linkage 130 between said baskets facilitates the opening, closing, and pressing operations. Said upper basket 120 rotates about the axis of said hinge 130 by an angle of about 180 degrees away from said lower basket 125 in order to provide unobstructed access to load materials to be pressed into said lower basket 125.

Said filtration bag 140 rests in said lower basket 125 and receives said unfiltered liquid 150 through an unobstructed opening at its top. A vessel 160 is configured with an opening of matching size and shape to said lower basket 125 to support said press 110 and to receive filtered liquid 155 that is emitted from said press 110 during its operation.

In said embodiment, the top edges of said baskets 120 and 125 and the opening of said vessel 160 are circular, though in other embodiments the top edges of said baskets and vessel can be semicircular, rectangular, square, or polygon shaped. The diameter widths of said baskets 120 and 125 and the opening of said vessel 160 are about 200 millimeters. The depths of said baskets are about 100 millimeters deep, about half the measurement of their diameter widths, which corresponds to a wide and shallow basket with a total volume of about two liters. This size of basket was found to perform very well when cold pressing up to 48 fluid ounces (1.5 liters) of cold-brewed beverage mixture —corresponding to six 8-ounce (250 milliliter) servings or eight traditional 6-ounce coffee servings. In other embodiments, the diameter widths of said baskets 120 and 125 can vary in size from about 150 millimeters up to about 300 millimeters and the depths can vary in size from about 75 millimeters up to about 150 millimeters which corresponds to wide and shallow-shaped baskets with total basket volumes of about one liter up to about seven liters.

In said preferred embodiment, the shape of the sides of said baskets 120 and 125 is selected to reduce snagging and pinching of said filtration bag 140 as said baskets press together. A preferred shape of the sides of said baskets 120 and 125 is the paraboloid shape such that their sides slope down nearly vertically from their top edges and gently curve inward to form a shallow round bottom. Another preferred shape of the sides of said baskets 120 and 125 is the conic section such that their sides slope significantly inward like an inverted cone while their bottoms are flat and circular with a smoothly rounded transition between their sides and bottom surfaces.

The width of hinge linkage 130 is selected to provide sufficient stability during the opening, closing and pressing operations. A classic barrel hinge comprising a pin surrounded by interlocking knuckles and opposing leaves can suppress the twisting of the baskets if said hinge is sufficiently wide and is mounted sufficiently close to the edges of the baskets. It has been found in practice that the barrel hinge should comprise at least four knuckles, the leaves and barrel should span a length of at least one quarter the total width of the baskets, and the leaves should be mounted on each basket so that the hinge barrel is offset from the basket edge a distance at most one quarter the total width of the baskets. In practice, the preferred width and length of the leaves of a barrel hinge are roughly equal at about 50 millimeters, though the widths and lengths can remain equal but vary from about 30 millimeters up to about 100 millimeters depending on the size of the baskets.

A more rudimentary hinge linkage 130 comprising two widely spaced clasps joining the baskets can provide sufficient stability by also suppressing the twisting of the baskets relative to each other. It has been found that the clasps should be separated by a width of about three quarters the total width of the baskets. The clasps must attach to clasp supports that extend sufficiently far off the basket edge so that an imaginary line drawn between the two clasps (representing the axis of the hinge) does not intersect the basket edge. It has been found in practice that the supports must extend by a distance of about one-eighth the total width of the baskets. In practice, the preferred spacing of the clasps is about 150 millimeters, though the spacing can vary from about 50 millimeters up to about 300 millimeters according to various embodiments. The preferred length of the clasp supports is about 25 millimeters, though the length of the supports can vary from about 10 millimeters up to about 50 millimeters according to various embodiments.

The range of angular motion of hinge linkage 130 is selected to allow said upper basket 120 to swing away from said lower basket 125 by an angle of 180 degrees in order to provide unobstructed access to insert, fill, and remove said filtration bag 140.

In said preferred embodiment, upper support 170 and lower support 175 are configured to be engaged by a user as comfortable fingertip gripping surfaces during opening, closing, and pressing operations. Said lower support 175 is further configured to hold said lower basket 125 above the opening of said vessel 160 which in turn holds entire said press 110 securely in places.

Said supports 170 and 175 completely surround edges of said baskets 120 and 125 and extend about two millimeters radially from the outermost edge, though said supports can extend up to about 50 millimeters from the outer edge in various embodiments. Said supports 170 and 175 can be further configured with one or more hand or finger grips to provide additional leverage and comfort. In various embodiments, the hand or finger grips extend about 30 millimeters and up to about 200 millimeters radially from the outermost edges of said baskets 120 and 125.

In said preferred embodiment, said vessel 160 can be configured as a wide pitcher with a handle 180 to assist lifting and a pour spout 185 to assist dispensing of filtered liquid 155.

Figure 6:
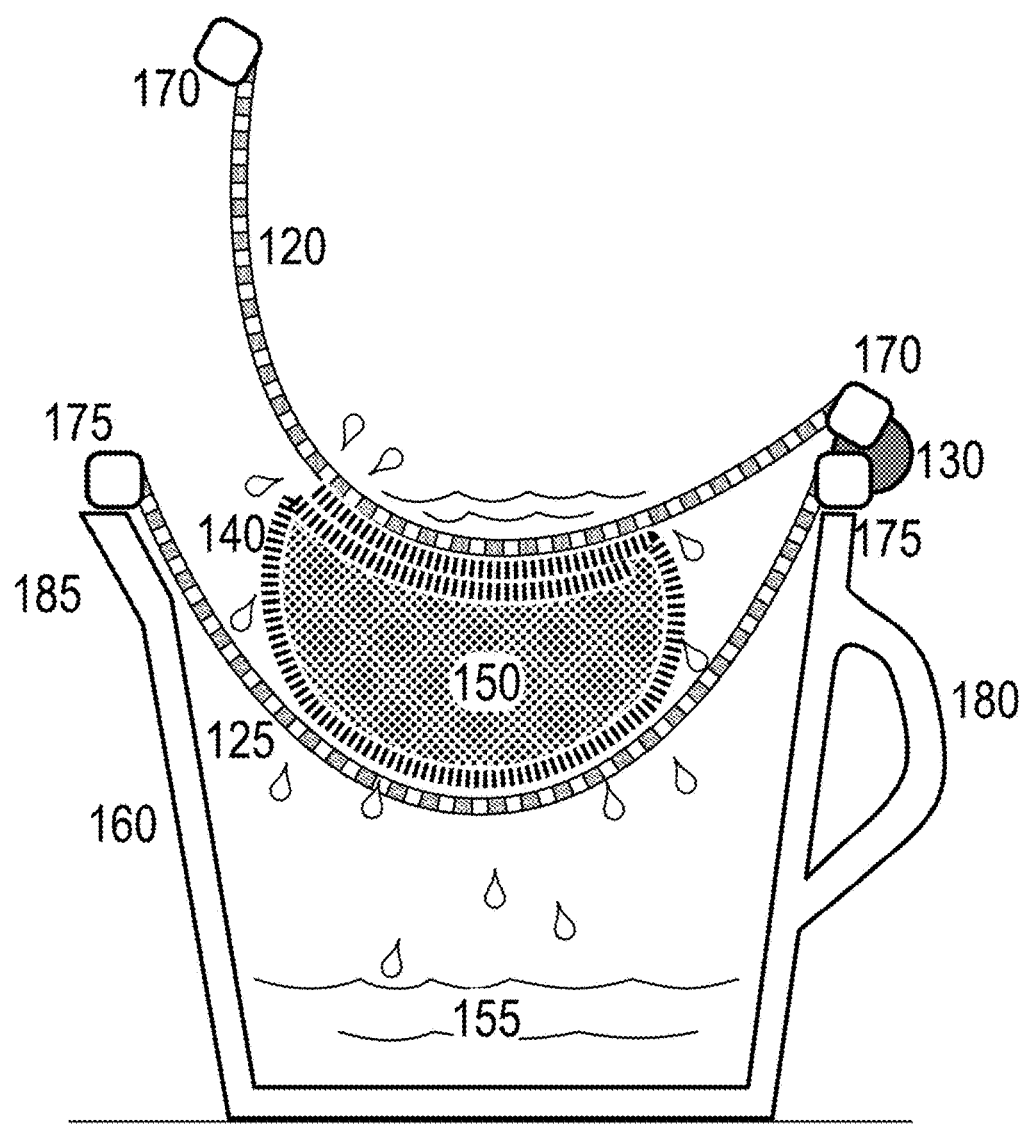
FIG. 6 shows said press 110 in a partially closed configuration representing the state when a filtered liquid is pressed out of said filtration bag according to a preferred embodiment of the invention.

FIG. 6 shows said liquid filtering press 110 in a partially closed configuration representing the state when said filtered liquid 155 is pressed out of said filtration bag 140 according to a preferred embodiment of the invention. Said baskets 120 and 125 press said filtration bag 140 from above and below. To get to this configuration from the open position represented in FIG. 5, the top of said filtration bag 140 is gathered and folded closed. Said upper basket 120 has rotated about the axis of said hinge linkage 130 by an angle of up to about 180 degrees. Said opening at the top of said filtration bag 140 remains pressed closed by the sustained pressure from above by said upper basket.

It is important to highlight how the hinge linkage 130 stabilizes the press at this step of press operation. Specifically, the linkage helps to hold the upper basket in position as it contacts the full filtration bag 140. Since the upper basket is not yet nested into the lower basket, the upper basket would fall from its unstable position without support provided by the linkage. The stabilization provided by the hinge linkage allows the user to let go of the upper basket momentarily to establish a comfortable fingertip contact with supports 170 and 175 and begin squeezing the press.

The flow of said filtered liquid 155 passing out of said filtration bag 140 increases as the user squeezes together supports 170 and 175. Mechanistically, squeezing the press increases the static pressure of said liquid 150 and overcomes the resistance of liquid flow through the small pores of said filtration bag 140.

It is important to highlight how the press keeps the user's hands away from said filtration bag 140 during pressing and also keeps the user's hands away from the flow of said filtered liquid 155 out of said press into said vessel 160. Consequently, the hand-to-liquid contact is prevented which increases the hygienics of said press 110 and said filtered liquid 155 while it also prevents the discomfort of prolonged hot- or cold-liquid exposure to the hands of the user.

As indicated in FIG. 6, some quantity of said filtered liquid 155 collects above said filtration bag 140 in bottom of said upper basket 120 which is addressed in the following step of press operation.

Figure 7:
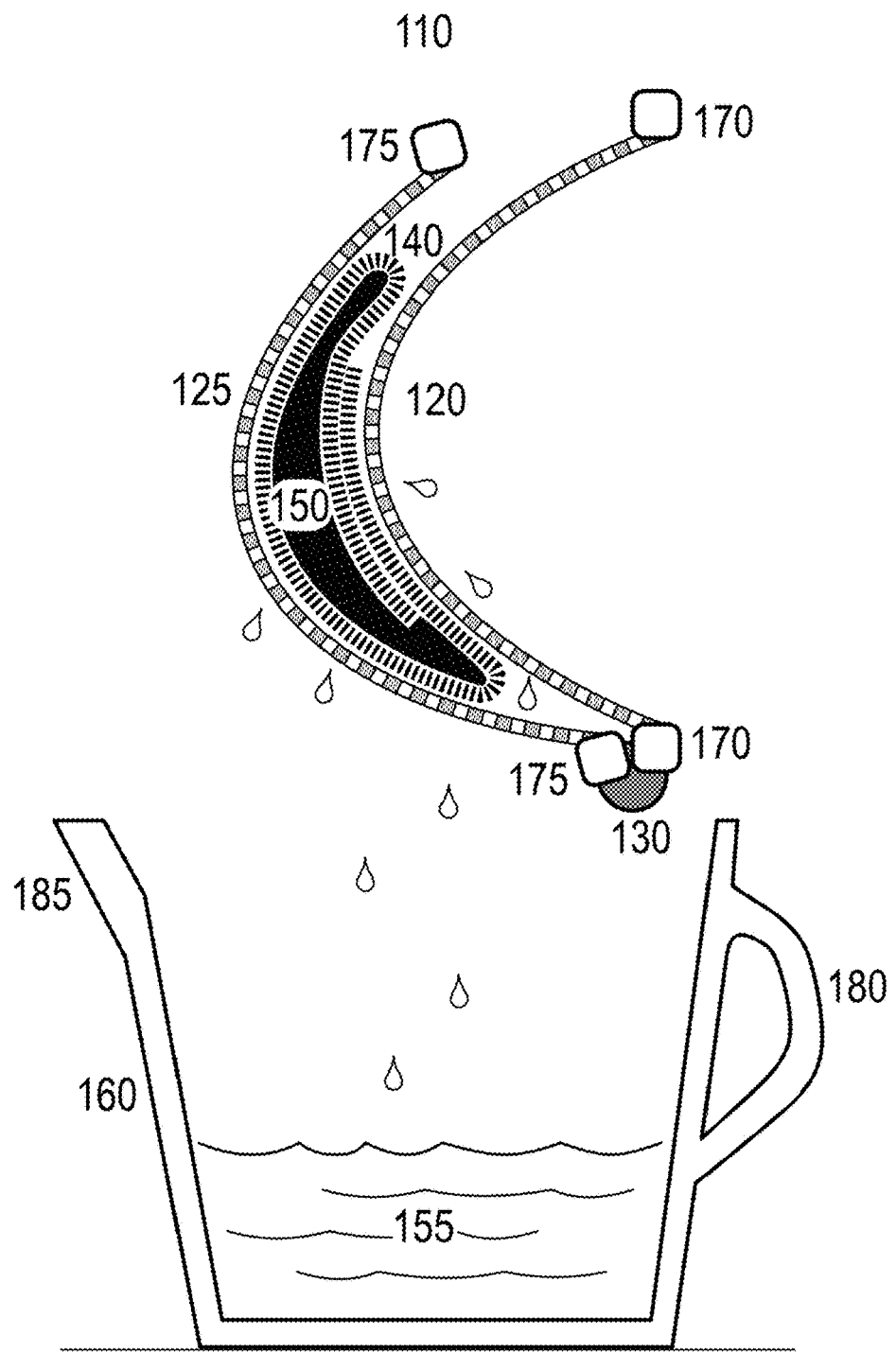
FIG. 7 shows said press 110 in a raised, rotated, and closed configuration representing the state when the residual quantity of said filtered liquid is pressed out of said filtration bag according to a specific embodiment of the invention.

FIG. 7 shows said liquid filtering press 110 in a raised and rotated configuration representing the state when the remaining quantity of said filtered liquid 155 is pressed out of said filtration bag 140 according to a specific embodiment of the invention. Said press 110 is raised and disengaged from said opening of said vessel 160. Said press 110 is rotated about 90 degrees while said baskets 120 and 125 apply pressure to said filtration bag 140 from opposing sides rather than from above and below as represented in FIG. 5.

The raised and rotated orientation of said press 110 has several important functions in the pressing operation. First, the rotated orientation pours off the portion of filtered liquid 155 that collects above filtration bag 140 in the lower region of upper basket 120. Second, the rotated orientation enables the user to squeeze together supports 170 and 175 using the thumbs and fingertips of both hands in a comfortable "steering wheel" grip. Third, the rotated orientation enables the user to more easily inspect the diminishing flow rate of filtered liquid 155 and better decide when to stop squeezing said press.

Figure 8:
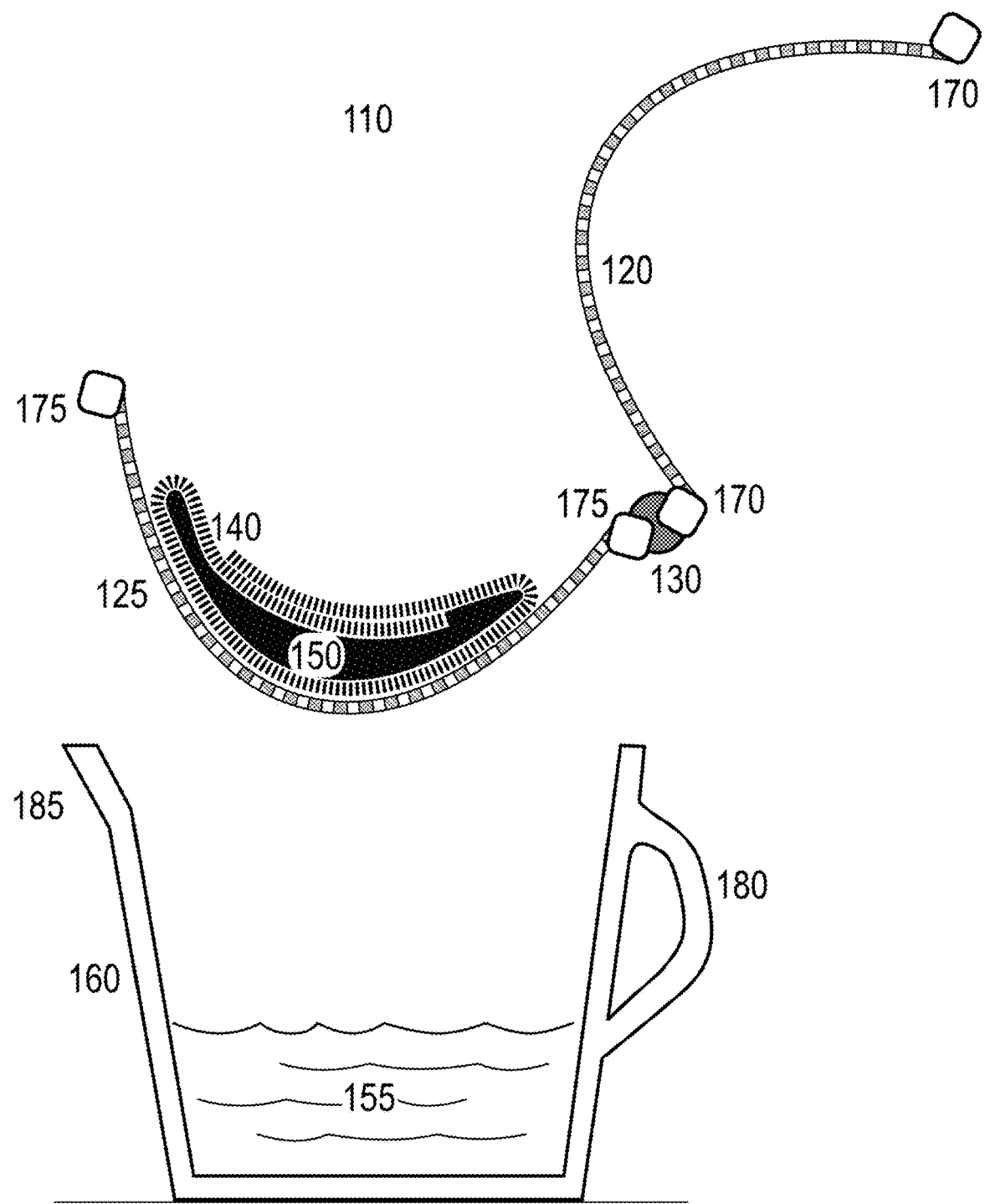
FIG. 8 shows said press 110 in an open configuration representing the state when pressing is complete according to a specific embodiment of the invention.

FIG. 8 shows the liquid filtering press 110 in a partly open configuration representing the state when pressing is complete according to a specific embodiment of the invention. Said press 110 is rotated back to a nearly vertical orientation and remains raised and disengaged from the opening of vessel 160. The filtration bag 140 and a fully pressed cake of the residual solids from the unfiltered liquid 150 rest in the bottom of the lower basket 125. The entire volume of filtered liquid 155 has been collected within vessel 160.

The upper basket 120 has been rotated about the axis of hinge 130 by an angle of about 90 degrees in order to open said press. Said filtration bag 140 can be removed and cleaned or disposed. Said pressed cake 150 can be disposed. Said press 110 can be cleaned. Said vessel 160 can be lifted by said handle 180 and said filtered liquid 155 can be dispensed with the aid of said spout 185.

While the above text and accompanying figures are a complete description of specific embodiments of the invention, they should not be taken as limiting the scope of the invention as defined by the claims. For instance, the filtering press described by this invention could be implemented for the separation of any solid and liquid mixture that may or may not be beverage or aqueous. The filtering press could be implemented to operate at any given temperature and pressure.

The invention claimed is:

1. A liquid filtering press for squeezing liquid out through a filtration bag, the liquid filtering press comprising:
   two rigid baskets that nest together and squeeze the filtration bag;
   a linkage between the two rigid baskets that facilitates an opening, a closing, a squeezing, and an orienting of the two rigid baskets;
   a fully open configuration to facilitate an insertion, a filling, and a removal of the filtration bag wherein a lower basket of the two rigid baskets is oriented to open upwards and an upper basket of the two rigid baskets, while remaining linked to the lower basket, is fully unstacked and oriented away from the lower basket;
   a partially closed configuration that stabilizes the closure of the filtration bag and to begin pressing wherein the two rigid baskets are oriented to nest together vertically;
   a rotated configuration to pour off filtered liquid pooling above the filtration bag and to finish pressing wherein the two rigid baskets are oriented to nest together horizontally; and
   a fully closed configuration wherein the upper basket nests within the lower basket and the bottoms of the two rigid baskets approach to within a distance corresponding to about 25% of the depths of the two rigid baskets.

2. The liquid filtering press of claim 1, wherein each of the two rigid baskets comprise in a range of around 100 millimeters to around 400 millimeters, depths in a range of around 50 millimeters to around 200 millimeters, and a length ratio of the baskets' widths to depths in a range of around 1.5 to around 3.

3. The liquid filtering press of claim 1, wherein the linkage between the two rigid baskets comprises a hinged joint to accommodate the opening and closing of the liquid filtering press whereby the upper basket unstacks by swinging about an axis of a hinge that spans an angular distance of around 180 degrees and spans a width up to the full width of the two rigid baskets.

4. The liquid filtering press of claim 1, wherein each of the two rigid baskets comprise a width and a depth in a range of around 75 millimeters to around 300 millimeters and a length ratio of the baskets' widths to depths in a range of around 0.5 to around 1.5.

5. The liquid filtering press of claim 1, wherein the linkage between the two rigid baskets comprises a sliding joint to accommodate the opening of the liquid filtering press whereby the upper basket unstacks by sliding along a straight rail that spans a distance of at least the depth of the two rigid baskets and spans a width of up to one-third the width of the two rigid baskets.

6. The liquid filtering press of claim 1, wherein the linkage between the two rigid baskets comprises a sliding and hinged joint to accommodate the opening of the liquid filtering press whereby the upper basket: unstacks by sliding along a straight rail that spans a distance of at least the depth of the two rigid baskets and spans a width of up to one-third the width of the two rigid baskets; and further unstacks by swinging about an axis of a hinge that spans an angular distance of around 180 degrees and spans a width of up to one-third the width of the two rigid baskets.

7. The liquid filtering press of claim 1, wherein the linkage between the two rigid baskets comprises a sliding and hinged joint to accommodate the opening of the liquid filtering press whereby the upper basket: unstacks by sliding along a straight rail that spans a distance of at least the depth of the two rigid baskets and spans a width of up to one-third the width of the two rigid baskets; further unstacks by sliding around a curved portion of rail; and further unstacks by swinging about the axis of a hinge such that the summation of the arc distance of travel around the curved rail and the angular distance of rotation around the hinge axis is around 180 degrees.

8. The liquid filtering press of claim 1, wherein each of the two rigid baskets are manufactured from a material selected from the group consisting of: metal, steel, stainless steel, wire, mesh, wire-reinforced mesh, plastic, wood, cane, bamboo, rattan, and wicker.

9. The liquid filtering press of claim 1, further comprising supports surrounding the two rigid baskets to be engaged by a user to provide leverage and comfort during pressing.

10. The liquid filtering press of claim 1, further comprising a support surrounding the lower basket that holds the liquid filtering press above the mouth of an open vessel.

11. The liquid filtering press of claim 1, further comprising a vessel, wherein the vessel comprises an opening that receives filtered liquid released from the filtration bag during the pressing.

12. The liquid filtering press of claim 11 wherein the vessel firmly supports the lower basket with an opening of matching size and shape.

13. The liquid filtering press of claim 11 wherein the vessel is a pitcher, and wherein the pitcher comprises a pour spout and a handle.

14. The liquid filtering press of claim 1, wherein the filtration bag is manufactured from a material selected from the group consisting of: mesh, fabric, non-woven fabric, fiber, cloth, cotton, nylon, polyester, paper, and pleated paper.

* * * * *

UNITED STATES PATENT AND TRADEMARK OFFICE
CERTIFICATE OF CORRECTION

| | | |
|---|---|---|
| PATENT NO. | : 11,707,153 B2 | Page 1 of 1 |
| APPLICATION NO. | : 17/180834 | |
| DATED | : July 25, 2023 | |
| INVENTOR(S) | : Todd Ewing | |

It is certified that error appears in the above-identified patent and that said Letters Patent is hereby corrected as shown below:

In the Claims

At Column 10, Claim number 2, Line number 59, delete "comprise in" and insert --comprise a width in--.

Signed and Sealed this
Nineteenth Day of September, 2023

*Katherine Kelly Vidal*

Katherine Kelly Vidal
*Director of the United States Patent and Trademark Office*